April 21, 1953  L. L. GORDON  2,635,746
TESTING AND SORTING CONTROL SYSTEM
Filed June 25, 1949  4 Sheets-Sheet 1
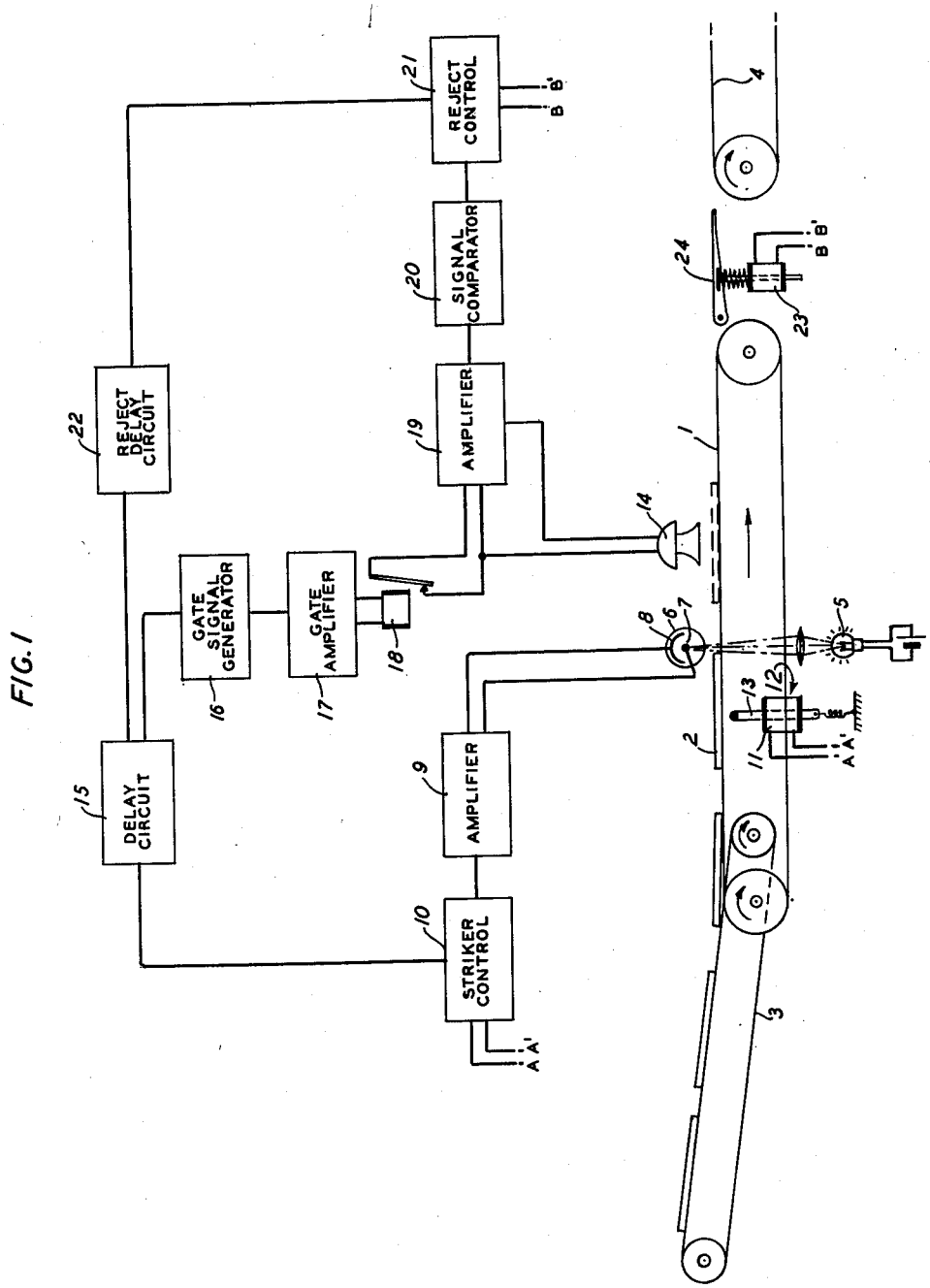
INVENTOR
LLOYD L. GORDON
BY
Pennie, Edmonds, Morton & Barrows.
ATTORNEYS

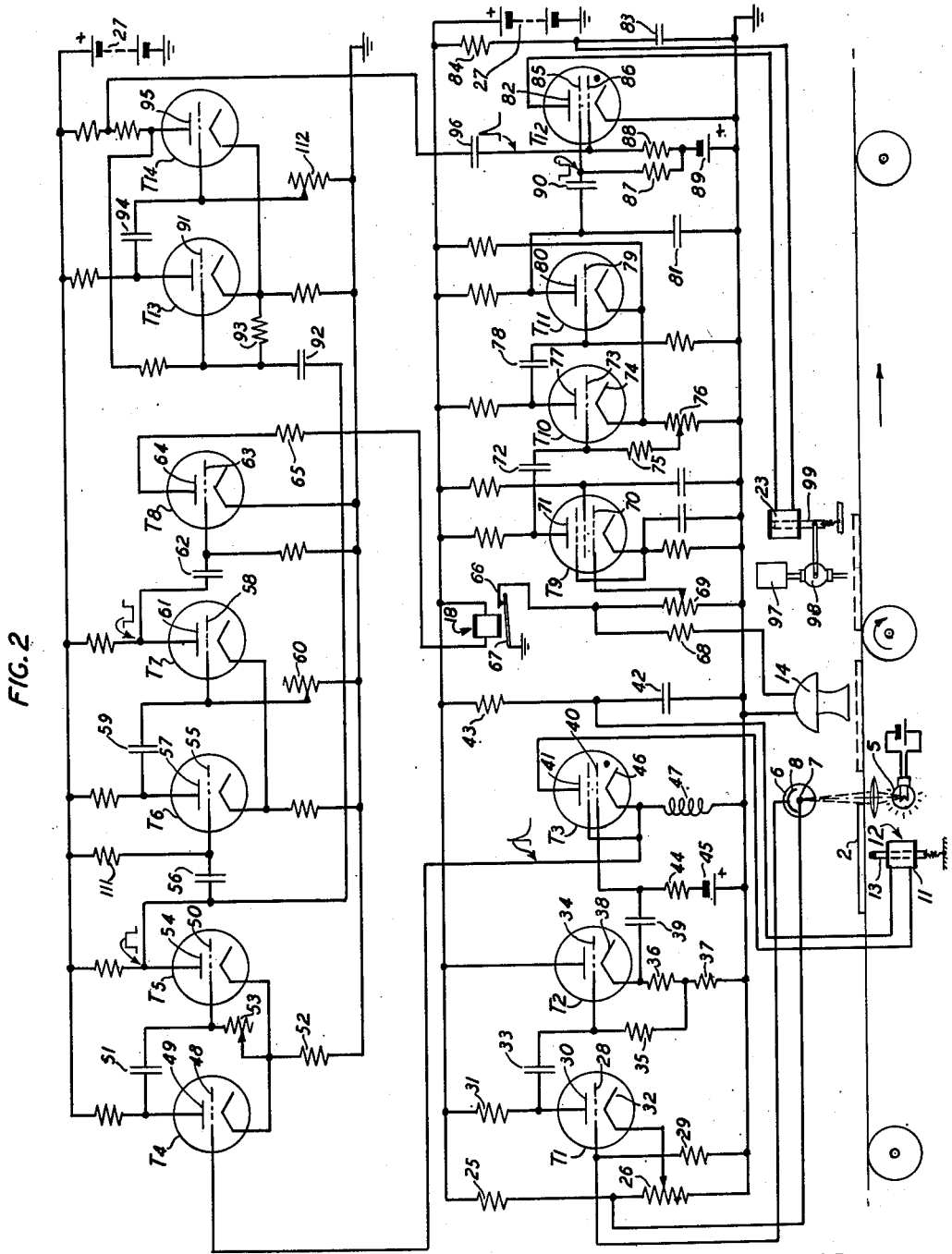

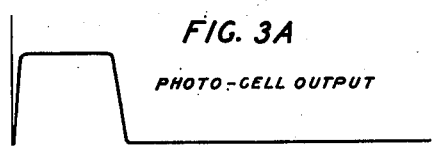
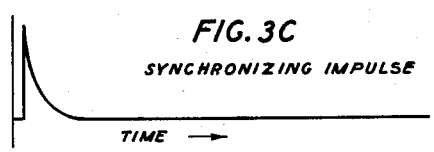
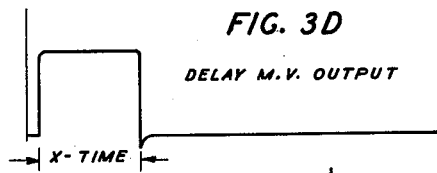
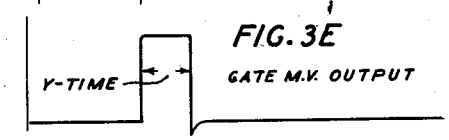
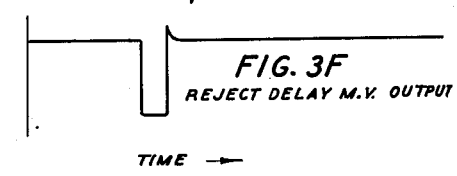
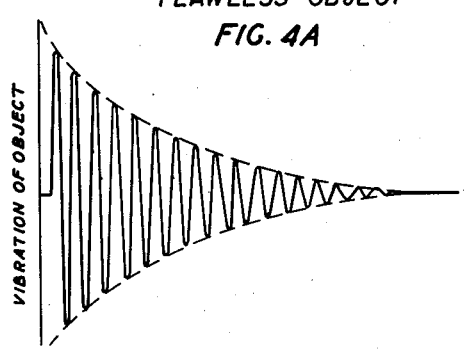

April 21, 1953 L. L. GORDON 2,635,746
TESTING AND SORTING CONTROL SYSTEM
Filed June 25, 1949 4 Sheets-Sheet 4

INVENTOR
LLOYD L. GORDON
BY
Pennie, Edmonds, Morton & Barrows.
ATTORNEYS

Patented Apr. 21, 1953

2,635,746

UNITED STATES PATENT OFFICE 2,635,746

TESTING AND SORTING CONTROL SYSTEM

Lloyd L. Gordon, West End, N. J., assignor to Electronic Associates, Inc., Long Branch, N. J., a corporation of New Jersey Application June 25, 1949, Serial No. 101,472

15 Claims. (Cl. 209—72)

This invention relates to object testing and sorting systems, and more particularly, to electric circuit arrangements useful in such systems.

There is described in copending application for United States Letters Patent Serial No. 101,471, filed June 25, 1949, by Lloyd L. Gordon and Charles M. Schedlbauer, an apparatus for the production testing of objects of which the vibration characteristics are changed by defects. The testing operation is preferably performed while the objects are moving along a test conveyor, the apparatus serving to identify or remove from the conveyor those objects having flaws or other mechanical defects. To this end the apparatus includes a striker for the percussive, impulsive initiation of mechanical vibrations in each object, an electromechanical transducer responsive to the vibrations of the object, and electrical apparatus for the automatic determination of the inner energy consumption or natural vibration frequency of the vibrating object as it moves along the test conveyor. The comparison of either characteristic with a predetermined standard then serves as a basis for rejecting or passing the object under test.

The present invention contemplates novel circuit arrangements useful particularly in connection with the apparatus of the above-referenced application. The circuit arrangements include control circuits for the vibration inducing mechanism, synchronizing circuits for actuating the transducer for a predetermined interval of time after the initiation of vibrations in an object, comparator circuits for comparing the amplitude or the frequency of the signals from the transducer with a standard, and circuits for actuating indicating or rejection apparatus when an object generates signals which fail to meet that standard. In a particular embodiment of the invention there is included a gaseous discharge device controlling a capacitor discharge circuit for the precise control of the action of the striker and for the generation of a synchronizing impulse at the time of action, a delay multivibrator for generating an impulse at a given time interval after the synchronizing signal, a switching circuit for activating the transducer circuit and controlled by a gating signal generator which is, in turn, responsive to the impulse from the multivibrator, a reject apparatus control circuit utilizing a gaseous discharge device, an impulse generator connected to the multivibrator for normally impressing an actuating impulse upon a control electrode of the gaseous discharge device at a time when the object under test is in a position for the action of the reject apparatus, and a detecting circuit connected to the transducer circuit for neutralizing the effect of the reject-apparatus-actuating impulse when the signals from an object indicate that the object is relatively flawless, that is, has a normal inner energy consumption or natural vibration frequency.

Among the advantages of the invention are that the tolerance range of differentiation between acceptable and unacceptable objects may be adjusted within a wide range, and that the circuit arrangements are highly stable in operation and are suitable for continuous operation under production conditions.

The invention, together with the objects and further advantages thereof, may be better understood by reference to the following detailed description taken in connection with the accompanying drawings, in which:

Fig. 1 is a schematic diagram of the circuit and associated apparatus of the invention;

Fig. 2 is a detailed diagram of the circuit of the invention;

Fig. 3 is a representation of the waveforms of the circuit of Fig. 2;

Fig. 4 is a representation of the vibrations and signals produced by flawless and flawed objects.

Figure 5:
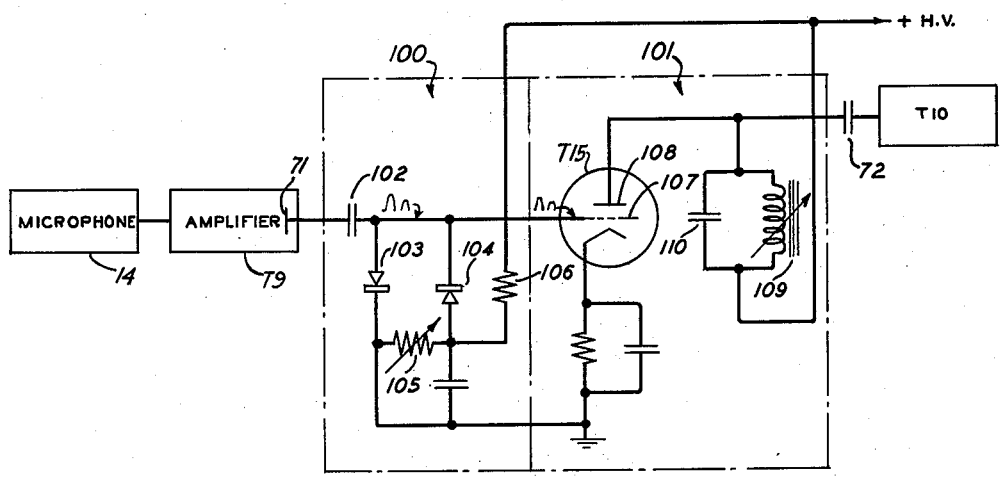
Fig. 5 is a diagram of a modification of the circuit of Fig. 2.

Referring now to Fig. 1, there is shown a conveyor 1 suitable for carrying an object to be tested, such as, for example, an architectural tile 2. The test conveyor 1 is shown as part of a typical arrangement in which a second conveyor 3 carries the object to be tested from the prior production operations to the test conveyor 1. A third conveyor 4 may be utilized to carry those objects of requisite quality on to further production operations. Conveyor 1 may travel at a predetermined uniform rate of speed, while conveyor 3 is driven at a speed such that the objects to be tested are delivered to conveyor 1 in a sufficiently spaced fashion.

A lamp 5 acts as a light source, the light being formed into a narrow beam directed transversely across the conveyor 1. A photoelectric cell 6 is disposed opposite the lamp 5 in a manner such that the light beam normally falls upon a cathode 7 of the cell 6 but is interrupted by the passage of the object to be tested along the conveyor. The cathode 7 and an anode 8 of the photoelectric cell 6 are connected to an amplifier 9 which serves to actuate a striker control circuit 10 upon the interruption of the light beam by the object. The striker control circuit 10, when actuated by the impulse from the amplifier 9, supplies a pulse of current to a coil 11 of a striker 12 which causes an armature 13 to strike the object 2 a sharp blow of an intensity determined by the amount of energy supplied to the coil 11 of the solenoid. The impact of the blow by the armature 13 thus imparts to the object 2 an impulse excitation which induces a train of damped, free mechanical vibrations in the object.

The vibrating object under test moves along the test conveyor 1 until it reaches a position adjacent a microphone 14. As explained in application Serial No. 101,471 above mentioned, the conveyor 1 may preferably be of a design and construction such that the rate of decay of the amplitude of the vibrations of the object under test is determined substantially by the inner energy dissipation of the object under test, the energy dissipation due to the conveyor being small compared to the energy dissipation inherent in the object. Under such conditions, the elapse of time during which the object travels from the position at which the vibrations are induced to a position adjacent the microphone 14 will result in a decrease in the amplitude of the vibrations of the object, the amount of decrease being determined by the inner energy consumption, or, equivalently, the mechanical quality of the object. In operation, the microphone 14 serves as an electromechanical transducer to convert the sound waves produced by the vibrating object into electrical variations having characteristics corresponding to those of the vibrations of the object under test. The characteristics of the electrical variations may then be utilized as a basis by which the defective objects may be separated from those of satisfactory quality.

The striker control circuit 10, when actuating the striker solenoid 12, simultaneously generates an impulse which serves as a synchronizing or timing impulse for the control of the subsequent operations. The timing pulse is effectively delayed in time by a delay circuit 15 which may be a delay multivibrator of known type or a functionally similar arrangement. The output of the delay circuit 15 is then utilized to control a gate signal generator 16 which produces an impulse of predetermined duration. This impulse is amplified by a gate amplifier 17 to deactuate a relay 18 which in turn renders the circuit of the microphone 14 active for the duration of the impulse. The time delay introduced by the delay circuit 15 is such that the microphone 14 is active only after a period in which the most significant changes in the vibration characteristics have taken place, as is more fully described below.

The electrical variations produced by the microphone 14 during the active period are amplified by an amplifier 19. The output of the amplifier is connected to a signal comparator 20 which determines the characteristics of the electrical variations arriving from amplifier 19. Thus the comparator may be arranged to produce an output signal or impulse if the input signal exceeds a predetermined amplitude level, but not to do so if the input signal is below that level.

A reject control circuit 21 is arranged to be responsive both to signals from the signal comparator 20 and a reject delay circuit 22. The reject delay circuit 22 is controlled by the impulses from the delay circuit 15 to produce impulses of a predetermined duration and which are delayed in time with respect to the impulses from the delay circuit 15. These pulses from reject delay 22 actuate reject control 21 for each object. The reject control circuit 21 may then be arranged so that for objects which produce signals at the output of the comparator 20, the reject control 21 remains inactive, whereas for objects which do not produce a signal at the output of the comparator the reject control actuates the solenoid 23 of suitable reject mechanism. The solenoid 23 is connected to a reject mechanism such as, for example, the trap 24, so that defective objects do not reach the conveyor 4.

Proceeding now to a more detailed description of the invention, reference may be made to Fig. 2 which shows a schematic diagram of the circuits of the invention. The description of the schematic diagram will be given also with reference to the functional diagram of Fig. 1.

The photoelectric cell 6 of Fig. 2 is connected to an amplifier including a tube T1 corresponding in function to the amplifier 9 of Fig. 1. The anode 7 of the photoelectric cell is connected to a voltage divider comprising a resistor 25 and a potentiometer 26 and supplied by a source of high potential, conventionally represented as a battery 27. The cathode 8 of the photoelectric cell is connected to a grid 28 of tube T1, the grid being connected to ground through a resistor 29. Anode 30 of tube T1 is energized by the battery 27 through an anode coupling resistor 31 while a cathode 32 is connected to the potentiometer 26 which provides a variable source of cathode bias potential. In operation, the interruption of the light from the source 5 falling upon the photoelectric cell 6 by the object 2 under test causes a sharp decrease in the potential of the grid 28 of tube T1. There is thus produced an abrupt increase in the potential of the anode 30.

The function of the striker control circuit 10 of Fig. 1 is performed by tubes T2 and T3 of Fig. 2. The positive potential change at the anode 30 of tube T1 is impressed through a coupling condenser 33 upon a control grid 34 of tube T2 which acts as a cathode-coupled amplifier. The grid 34 is connected through a resistor 35 to the cathode coupling resistors 36 and 37 which are connected between cathode 38 of tube T2 and the common ground lead and negative pole of the potential source 27. The positive change in potential of the cathode 38 due to the positive impulse upon the grid 34 is communicated through a coupling condenser 39 to a control grid 40 of a gaseous discharge device T3. Anode 41 of tube T3 is connected through the coil 11 of the striker 12 to a condenser 42 which is charged from the potential source 27 by means of a resistor 43 which serves also as a current limiting resistor when the tube T3 is in a conducting condition. A resistor 44 is connected from the control grid 40 to a source 45 of bias potential which serves to keep the tube T3 in a normally non-conducting condition. Cathode 46 of tube T3 is connected to ground through a coil 47 which serves as an impedance across which a sharp positive synchronizing impulse is generated when the tube is fired by a positive impulse upon the control grid 40. In operation the tube T3 is fired by the positive impulse from tube T2 so that the condenser 42 discharges through the coil 11 of the solenoid 12. The positive impulse from tube T2 ceases before the discharge is completed so that at such a time as the condenser 42 is sufficiently discharged the tube T3 becomes non-conducting due to the deionization of the gaseous medium. The condenser 42 is then recharged. The gaseous discharge device T3 thus serves to actuate the striker solenoid 12 when the object 2 is in the proper position while at the same time providing a synchronizing pulse for the control of subsequent operations.

The function of the delay circuit 15 of Fig. 1 is performed by tubes T4 and T5 of Fig. 2 and the circuits associated therewith. Tubes T4 and T5 are connected so as to form a single impulse multivibrator having a cycle which is initiated by the synchronizing pulse generated in the cathode circuit of tube T3. The synchronizing impulse from the cathode circuit of tube T3 is impressed upon a control grid 48 of tube T4 which is in a normally non-conducting condition. The positive impulse upon the grid 48 causes the tube T4 to conduct, thus causing a decrease in the potential of anode 49, the negative impulse being imparted to a control grid 50 of tube T5 by means of a coupling condenser 51. Tube T5 becomes non-conducting and, due to the fact that the cessation of current flow through the tube T5 causes a decrease in the potential drop across the common cathode coupling resistor 52 and hence increases the conductivity of the tube T4, the circuit remains stable in this condition. Tube T4 continues in a conducting condition and tube T5 in a non-conducting condition until the coupling condenser 51 is discharged by the grid resistor 53 to a potential such that the control grid 50 of tube T5 allows that tube to again become conducting and tube T4 returns to the non-conducting state. There is thus formed at the anode 54 of tube T5 a positive potential pulse having a duration determined essentially by the condenser 51 and by the adjustment of resistor 53.

The function of the gate signal generator 16 (Fig. 1) is performed by tubes T6 and T7 and the circuits associated therewith. Tubes T6 and T7 are connected to form a single impulse cathode-coupled multivibrator similar in all essential respects to that formed by the tubes T4 and T5 with the exception that the grid input circuit of tube T6 is so arranged that tube T6 is normally conducting while tube T7 is normally non-conducting. The positive potential pulse formed at the anode 54 of tube T5 is imparted to control grid 55 of tube T6 by means of a coupling condenser 56. The coupling condenser 56 and the associated grid resistor 111 have a time constant such that, at the cessation of the positive impulse from tube T5, the control grid 55 is driven negative, thus rendering tube T6 non-conducting. The potential of the anode 57 of tube T6 thus becomes more positive, the positive impulse being communicated to a control grid 58 of tube T7 by means of a coupling condenser 59. Tube T7 then becomes conducting and remains in that condition until the coupling condenser 59 is sufficiently discharged by grid resistor 60. There is thus formed at the anode 61 of tube T7 a negative potential pulse which is initiated at essentially the same time as the cessation of the positive pulse at the anode 54 of tube T5 and having a duration determined essentially by the size of the coupling condenser 59 and the adjustment of the resistor 60.

Tube T8 serves as the gate amplifier 17 of Fig. 1. The negative potential impulse formed at the anode 61 of tube T7 is imparted through the coupling condenser 62 to the control grid 63 of tube T8. Anode 64 of tube T8 is connected through a current limiting resistor 65 and the field coil of relay 18 to the positive pole of the source of high potential 27. The contacts of the relay 66 and 67 are held in a closed position by the normal anode current of the tube T8 so that the negative potential impulse which is applied to the grid 63 decreases the anode current, thus opening the contacts and activating the circuit of the microphone 14.

Returning now to the object under test, it will be seen that, due to the intensity of the impulsive excitation imparted by the striker 12, the object will continue in mechanical vibration as it moves along the conveyor to a position under the microphone. The sound waves produced by the mechanical vibrations of the object are imparted to the microphone which in turn generates a train of damped electrical vibrations having amplitude and frequency characteristics corresponding substantially to the amplitude and frequency characteristics of the mechanical vibrations of the object under test. The microphone 14 is connected through the contacts 66 and 67 of the relay 18 so as to be normally grounded. As has previously been explained, however, the relay 18 is opened so as to activate the microphone 14 after a suitable time delay introduced by the delay multivibrator formed by tubes T4 and T5. It is thus necessary that the conveyor 1 travel at a relatively constant rate of speed and that the delay between the action of the striker 12 and the activation of the microphone 14 correspond to that speed.

During those periods in which the microphone 14 is active, the electrical variations are amplified by tube T9 which is a linear amplifier corresponding in function to the amplifier 19 of Fig. 1. The variations are impressed through a resistor 68 and a potentiometer 69 upon control grid 70 of the tube T9, while the amplified variations appearing at anode 71 are impressed through a coupling condenser 72 upon control grid 73 of tube T10.

Tubes T10 and T11 and the circuits associated therewith perform the functions of the signal comparator 20 of Fig. 1. In the present embodiment of the invention, this function comprises the measurement of the amplitude of the signal variations received from the anode 71 of tube T9 and the generation of a potential impulse if the signal amplitude exceeds a predetermined value or standard. Tubes T10 and T11 are normally conducting, tube T10 normally having a somewhat greater anode current than tube T11. The control grid 73 and the cathode 74 of tube T10 in conjunction with the grid resistor 75 and the cathode potentiometer 76 serves in effect as a biased rectifier or detector. In operation, those portions of the amplified signal which are of an amplitude greater than the value of the bias are rectified and the resulting voltage which is formed across the grid resistor 75 is added to the value of bias normally determined by the adjustment of the cathode potentiometer 76. As the effective bias on the control grid 73 increases, the anode current decreases so that the potential of the anode 77 becomes more positive. This potential change is communicated to the control grid 79 of tube T11 by means of the coupling condenser 78 causing the anode current of tube T11 to increase and the potential of the anode 80 to decrease. Due to the presence of a common cathode coupling potentiometer 76, the increase in anode current of tube T11 causes a further increase in the potential of the anode 77 of tube T11 and the process continues until such time as a saturation point is reached. There is thus formed a strong negative potential impulse at the anode 80 of tube T11. A condenser 81 serves to eliminate any signal variations which may have been incorporated in the impulse.

If the amplitude of the signal variations impressed upon the control grid 73 of tube T10 is less than the value of bias determined by the adjustment of the potentiometer 76 there is no signal rectification. There is, therefore, no change in the bias of the tube T10, and no potential impulse is formed at the anode 80 of tube T11.

The function of the reject control circuit 21 of Fig. 1 is performed by tube T12 and the circuits associated therewith. Tube T12 is a gaseous discharge device having an anode 82 connected through the solenoid 23 to a condenser 83 which is charged through a current limiting resistor 84 by the potential source 27. Condenser 83 is proportioned so as to energize the solenoid 23 only for the desired period of time. At the end of the desired time the potential across the condenser must reach a value such that the tube T12 becomes deionized and the entire cycle may then be repeated for another object. The grids 85 and 86 of tube T12 are connected through grid resistors 87 and 88 respectively to a source 89 of bias potential, the bias being of a magnitude sufficient to maintain the device in a normally non-conducting condition. The grid 85 is coupled to the anode 80 of tube T11 by means of a coupling condenser 90 so as to impress the negative impulses generated at the anode 80 upon the grid 85.

The action of tube T12 is controlled not only by the negative potential impulses from tube T11 but also by impulses from tube T14. Tube T14 and tube T13 form a single impulse multivibrator responsive to the positive impulses generated by tube T5 and perform the function of the reject delay circuit 22 of Fig. 1. The positive impulses from the anode 54 of tube T5 are impressed upon control grid 91 of tube T13 through a coupling condenser 92. Tube T13 is normally in a conducting condition and condenser 92 and grid resistor 93 are proportioned so that the grid 91 is driven negative and the tube rendered non-conducting at the cessation of the positive exciting impulse. Tube T14 then becomes conducting and remains in the conducting condition until the coupling condenser 94 is sufficiently discharged. There is thus formed at the anode 95 of tube T14 a negative potential impulse which is initiated at essentially the same time as the cessation of the positive pulse at the anode 54 of tube T5 and having a duration determined by the size of the coupling condenser 94 and the adjustment of the associated variable grid resistor 112. The negative impulse thus formed is impressed through a coupling condenser 96 upon the grid 86 of tube T12.

The control of the action of tube T12 by the impulses from tubes T11 and T14 depends essentially upon the simultaneous occurrence of those impulses. The coupling condenser 96 and grid resistor 88 are of such values that they act as a differentiator for the negative potential impulses communicated from the anode 95 of tube T14 to the grid 86 of tube T12. Hence, at the cessation of the pulse the grid 86 becomes sufficiently positive so that tube T12 would normally fire. If, however, the object under test is of a quality such that the vibrations have not been excessively dissipated before the microphone 14 is activated, the action of tubes T10 and T11 will serve to generate a negative impulse which is impressed upon the grid 85 of tube T12, thereby counteracting effect of the positive impulse upon the grid 86, and the tube does not fire. In the event that the object under test is defective, the vibrations will be dissipated to such an extent that the signal impressed upon the grid 73 of tube T10 will be less than the normal bias and a negative impulse will not be impressed upon the grid 85. Tube T12 will then be fired by the impulse from tube T14 and condenser 83 will discharge into the solenoid 23.

The reject mechanism illustrated in Fig. 2 is an alternative to that of Fig. 1, similarly serving as a separating means in identifying those objects which fail to meet the standard imposed by the adjustment of the test apparatus. The mechanism comprises a reservoir 97 which is capable of holding a marking fluid such as an ink, and preferably under pressure. The flow of the fluid is controlled by a valve 98 which is connected to an armature 99 of the solenoid 23. The firing of tube T12 by a defective object thus energizes the solenoid 23 to open the valve 98 so that the marking fluid is sprayed upon the defective object. It is to be understood of course that the reject mechanism should be positioned quite closely to the microphone 14 since a very low order of time delay is introduced by the action of tubes T9 through T12, in the embodiment described.

It is an essential requirement in the operation of the apparatus of the invention that the action of the striker 12 be uniform, that is, each object must receive a blow of uniform intensity. Accordingly, it will be understood that the use of the battery 27 as an energy source for the storage capacitor 42 in Fig. 2 is purely conventional, it being desirable in practice to use a separate voltage-regulated power supply.

Referring now to Fig. 3, there is shown a series of sketches of the signal waveforms of the illustrative circuit of Fig. 2, the time-cycle shown being that for the testing of a single object. The waveforms of Figs. 3–A through 3–C are largely self-explanatory, the potentials represented being those across the electrodes of the photocell 6; from the cathode 38 of tube T2 to ground; and from the cathode 46 of tube T3 to ground; respectively. Fig. 3–D represents the waveform of the output of the multivibrator composed of tubes T4 and T5 of Fig. 2. The duration or time-length of the impulse, denoted by "X-time" corresponds to the delay of the synchronizing impulse by the delay circuit 15 of Fig. 1, and, in the particular circuit of Fig. 2, is controlled by the potentiometer 53. Fig. 3–E represents the waveform of the output of the multivibrator composed of tubes T6 and T7 of Fig. 2, that is, the gating signal formed by the gate signal generator 16 of Fig. 1. The duration or "Y-time" of the impulse determines the duration of activation of the microphone 14 and is controlled by the adjustment of the potentiometer 60 of Fig. 2. Fig. 3–F represents the waveform of the output of the multivibrator composed of tubes T13 and T14 of Fig. 2, the duration of the impulse corresponding functionally to the delay introduced by the reject delay circuit 22 of Fig. 1. It is to be understood of course that the waveforms shown are essentially schematic in nature.

Referring now to Figs. 4A to 4C, inclusive, there are shown schematic representations of the signals produced by objects, in the exemplary case, architectural tile, which are relatively flawless as compared with those produced by objects having serious mechanical flaws. Fig. 4–A shows the nature of vibrations of a relatively flawless object after impulsive excitation. It will be noted that these comprise a damped train and that the rate of decrease of amplitude of successive cycles of oscillation is relatively small, corresponding to a low internal energy consumption in the object. Figure 4-D shows a train of free oscillations of an object having mechanical flaws, the decrement or rate of decrease of amplitude of successive cycles of oscillation being relatively high, corresponding to a high internal energy consumption. Figs. 4-B and 4-E represent the electrical signals corresponding to the respective mechanical oscillations of the objects under test. It will be noted that it is a central portion only of the wave-train which is impressed upon the input of the amplifier T9 of Fig. 2 due to the action of the gating signal of Fig. 3-E. The frequency of the signals will correspond to the natural vibrational frequency of the object under test since harmonic vibrations induced by impulse excitation will have been dissipated during the elapsed time interval X. Fig. 4-C and 4-F represent the signals at the output of the tube T11 of Fig. 2 for the two cases, respectively.

A consideration of Figures 4-A to 4-F, inclusive, will make clear an essential feature and highly important advantage of the circuits of the invention. It will be realized that ordinary production variations of objects such as ceramic tile may vary considerably, some being substantially perfect, others having minor imperfections such as small surface cracks, while others may have serious defects. Since the variation of the inner energy consumption of the objects varies not only as the magnitude of an individual flaw, but also according to the sum of all flaws, whether large or small, the invention automatically provides a measure of all the flaws. Due to shock excitation at the instant of impact and for a few cycles thereafter an excess of harmonics is usually present, and these tend to mask the normal vibrations which truly represent the condition of the object. Since the present circuit arrangement provides means for control of the elapse of time between the initiation of vibration and the time of beginning of measurement, that is, X-time, and the number of vibrations used as a basis of comparison of amplitude, that is, Y-time, it will be seen that a precise determination of quality may be made within as great or as small limits of tolerance as is desired.

The embodiment of the invention thus far described employs the inner energy consumption characteristic as a basis for distinguishing between acceptable or unacceptable objects. As has been previously mentioned, the natural frequency of vibration may, in some applications be used as such a basis in applications where an object having internal mechanical flaws has a natural vibration rate differing substantially from that of a relatively flawless object. There is shown in Fig. 5 a circuit useful as a modificator of the signal comparator circuit of Fig. 2 to form an embodiment of the invention useful for such a method of sorting or inspecting objects.

The circuit of Fig. 5 comprises a clipper 100 and a frequency-selective amplifier 101, the arrangement being intended for connection between the anode 71 of tube T9 and capacitor 72 of Fig. 2. The signal from the anode 71 is imparted through a coupling capacitor 102 to a half-wave rectifier 103, such as a diode or crystal, which serves to eliminate the negative half-cycles of the wave trains. A second half-wave rectifier 104 then serves to eliminate the portions of the positive half-cycles of the wave-train whose amplitude is greater than a reference voltage generated by a voltage divider formed by resistors 105 and 106. There is thus impressed upon the grid 107 of tube T15 a series of unidirectional pulses of constant amplitude and of repetition rate equal to the frequency of the impressed wave-train. The anode 108 of tube T15 is connected to a source of potential through an inductor 109 which, together with a capacitor 110, forms a parallel-resonant circuit. In operation, the output of the amplifier 101 will comprise essentially sinusoidal waves whose amplitude will be strongly dependent upon the repetition rate of the impulses impressed upon the grid 107 of tube T15. The circuit formed by the inductor 109 and the capacitor 110 is adjusted to resonate at a frequency corresponding to the natural vibration rate of an acceptable specimen of the tile or object under test. Thus, for defective objects, the amplitude of the signal impressed upon the grid of tube T10 will be much lower than that of the acceptable objects, causing such defective units to be rejected in the manner previously described in connection with Fig. 2.

It will now be apparent that the circuits of the invention embody many novel features which in coordinated relation and operation render an optimum performance of the intended functions. It will be understood, however, that the embodiment of the invention described herein is a presently preferred form and that many changes and modifications in design may be employed without departing from the spirit and scope of the appended claims.

I claim:

1. In a sorting device, a conveyor for carrying objects to be sorted, means for impulsively initiating mechanical vibrations in each object, control circuits responsive to the position of an object along said conveyor for generating synchronizing signals and for actuating said vibration-initiating means, an electromechanical transducer responsive to the vibrations of the object for generating electrical signals, rejection means for designating the rejection of an object which causes the generation of electrical signals different from a predetermined value, a connecting circuit between said transducer and said rejection means, activating means responsive to said synchronizing signals for activating said connecting circuit, and delay-circuit means connected in said connection circuit between said transducer and said rejection means, said delay-circuit means being adjusted to connect said transducer to said rejection means only for a predetermined period of time subsequent to and exclusive of the initiation of vibrations in an object by said vibration-initiating means.

2. In a sorting device, a conveyor for carrying the objects to be sorted, control circuits for generating first and second synchronizing signals, said circuits being responsive to successive positions of the objects along said conveyor, means responsive to said first synchronizing signals for impulsively initiating mechanical vibrations in each object successively, an electromechanical transducer responsive to the vibrations of an object for generating electrical signals, means for measuring the signals generated by said transducer to determine the relative quality of each object, rejection apparatus positioned along said conveyor, a rejection control circuit for said rejection apparatus comprising a gaseous discharge device having at least two control electrodes, means connecting said quality-determining means to one control electrode of said discharge device, and means responsive to said second synchronizing signals for impressing impulses upon another control electrode of said discharge device.

3. The invention in accordance with claim 2, in which said last named means comprises a delay circuit for forming an impulse a predetermined length of time after the occurrence of each synchronizing signal.

4. The invention in accordance with claim 2, in which said last named means comprises a first signal impulse multivibrator, and which includes a second single impulse multivibrator responsive to the cessation of an impulse from said first multivibrator, and a differentiator for generating a positive impulse upon the cessation of the impulse from said second multivibrator.

5. In a sorting device, a conveyor for carrying the objects to be sorted, control circuit means for generating synchronizing signals, said circuit means being responsive to successive positions of the objects along said conveyor, means responsive to said synchronizing signals for impulsively initiating mechanical vibrations in each object, an electro-mechanical transducer responsive to the vibrations of an object for generating electrical signals, a signal comparator for generating impulses in response to signals from flawless objects, delay-circuit means controlled by said synchronizing signals connected between said transducer and said comparator and adjusted to transmit the electrical signals from said transducer to said comparator a predetermined time after and including the initiation of vibrations in an object, rejection apparatus connected to said comparator, and means responsive to said synchronizing signals for actuating said rejection apparatus only in the absence of impulses from said comparator.

6. In apparatus for sorting objects, a striker mechanism for inducing damped mechanical vibrations in each object, a photoelectric control circuit responsive to the positioning of an object adjacent said striker mechanism, a striker control circuit connected between said photoelectric circuit and said striker mechanism and being adapted to actuate said striker mechanism and simultaneously to generate synchronizing signals, a microphone for generating electrical signals in response to the damped vibrations of an object, quality-determining apparatus having an output voltage and connected to said microphone for comparing the signals from said microphone with a standard, time delay means responsive to each of said synchronizing signals for generating a pulse a predetermined time subsequent to and excluding the initiation of said electrical signals, means initiating actuation of said quality-determining apparatus in response to said pulse, rejection apparatus, and a circuit connected to said quality-determining apparatus for actuating the rejection apparatus in response to the output voltage of said quality-determining apparatus.

7. In apparatus for sorting objects, a conveyor, a striker mechanism for inducing a train of damped mechanical vibrations in an object positioned on said conveyor, a photoelectric control circuit responsive to the positioning of an object in actuating relation to said striker mechanism, a striker control circuit connected between said photoelectric circuit and said striker mechanism, a microphone disposed adjacent said conveyor in position to be actuated by vibrations from an object thereon to produce electrical signals, means for generating an impulse in response to said electrical signals when the same are of predetermined characteristics, connecting means for transmitting said electrical signals to said impulse-generating means, time delay means actuated by signals from said striker control circuit connected to actuate said connecting means for a predetermined interval of time less than the period of said train, a rejection control circuit connected to said impulse-generating means, and means for actuating said rejection control circuit only in the absence of an impulse from said impulse-generating means.

8. In a device for sorting objects, means for generating a synchronizing signal, vibration means actuated by said signal for impulsively initiating a train of damped mechanical vibrations in an object, said train being of a certain time period, an electromechanical transducer responsive to the vibrations of the object for generating electrical signals corresponding to said vibrations, rejection apparatus, a control circuit connected to said rejection apparatus to actuate the same, a signal comparator connected between said transducer and said control circuit, and time limiting means actuated by said synchronizing signal for automatically rendering said comparator responsive to the electrical signals from said transducer for a predetermined interval of time less than the period of said train of vibrations and commencing appreciably after the initiation of the train of vibrations in the object.

9. In a sorting device, a conveyor for carrying the objects to be tested, means for impulsively initiating a train of damped mechanical vibrations in each object, a synchronizing circuit for generating synchronizing signals, said circuit being responsive to successive positions of the objects along said conveyor for actuating said vibration-initiating means, a first impulse generator responsive to the vibrations of an object for generating an actuating impulse, delay means actuated by said synchronizing signals for initiating the operation of said generator only when the rate of decay of amplitude of those vibrations is less than a predetermined value, a second impulse generator responsive to said synchronizing signals, rejection apparatus, and a rejection control circuit connected to respond to both said impulse generators so as to actuate said rejection apparatus in response to said actuating impulse in the absence of an impulse from said first generator.

10. The invention in accordance with claim 9 in which said rejection control circuit comprises a gaseous discharge device having a different control electrode connected to each impulse generator.

11. In a sorting device, a conveyor for carrying objects to be sorted, means for impulsively initiating mechanical vibrations in each object, control circuits responsive to the position of an object along said conveyor for generator synchronizing signals and for actuating said vibration-initiating means, an electromechanical transducer responsive to the vibration of the object for generating electric signals, rejection means for designating the rejection of an object which causes the generation of electric signals different from a predetermined value, a connecting circuit between said transducer and said rejection means, activating means responsive to said synchronizing signals for activating said connecting circuit only for a predetermined period of time and subsequent to and exlusive of the initiation of the vibrations in an object, the activating means for said connecting circuit comprising a delay circuit, a gate signal generator connected to the output of said delay circuit for generating a delayed gating impulse, and impulse-operated switching means connected in said connecting circuit effectively to open and close the same.

12. In a sorting device, a conveyor for carrying objects to be sorted, means for impulsively initiating mechanical vibrations in each object, control circuits responsive to the position of an object along said conveyor for generating synchronizing signals and for actuating said vibration-initiating means, an electro-mechanical transducer responsive to the vibration of the object for generating electric signals, rejection means for designating the rejection of an object which causes the generation of electric signals different from a predetermined value, a connecting circuit between said transducer and said rejection means, activating means responsive to said synchronizing signals for activating said connecting circuit only for a predetermined period of time and subsequent to and exclusive of the initiation of the vibrations in an object, the activating means for said connecting circuit including a first multivibrator and a second multivibrator responsive to the cessation of an impulse from said first multivibrator and a relay responsive to an impulse from said second multivibrator included in said connecting circuit.

13. In a device for sorting objects, means for impulsively initiating a train of substantially free, damped, mechanical vibrations in an object, an electro-mechanical transducer responsive to the vibrations of the object for generating electric signals corresponding to said vibrations, means for transmitting the signals from said transducer only for a predetermined period of time subsequent to the initiation of vibrations in the object, so as to include vibrations occurring substantially only in the central portion of said train, rejection apparatus, control circuits for actuating said rejection apparatus, and a signal comparator connected between said control circuits and said signal transmitting means operable to compare the characteristics of the electric signals with a standard and to cancel the action of said control circuits when the signals meet that standard, said comparator comprising a clipper, a frequency selective amplifier, a bias detector and an impulse generator in serial connection.

14. In a device for sorting objects, means for impulsively initiating a train of substantially free, damped, mechanical vibrations in an object, an electro-mechanical transducer responsive to the vibrations of the object for generating electric signals corresponding to said vibrations, means for transmitting the signals from said transducer only for a predetermined period of time subsequent to the initiation of vibrations in the object as as to include vibrations occurring substantially only in the central portion of said train, rejection apparatus, control circuits for actuating said rejection apparatus, and a signal comparator connected between said control circuits and said signal transmitting means operable to compare the characteristics of the electrical signals with a predetermined standard and to cancel the action of said control circuits when the signals meet that standard, said comparator comprising a signal amplitude limiter, a frequency-selective amplifier, a circuit for passing signals of greater than a predetermined amplitude and an impulse generator in serial connection.

15. In a device for sorting objects, means for impulsively initiating a train of substantially free, damped, mechanical vibrations in an object, an electro-mechanical transducer responsive to the vibrations of the object for generating electric signals corresponding to said vibrations, rejection apparatus and impulse-responsive control-circuit means for actuating the same, means including delay circuit means connected between said transducer and said control circuit means for transmitting the signals from said transducer to said control circuit means only for a predetermined period of time following and excluding the initiation of vibrations in the object, the timing of said delay circuit means being such as to transmit vibrations occurring substantially only in the central portion of said train, and a signal comparator connected between said signal-transmitting means and said control circuit means, and being operable to compare the characteristics of the electric signals with a predetermined standard and to cancel the action of said control circuit means when the signals meet that standard, said comparator comprising a biased detector and an impulse generator controlled by signals from said detector.

LLOYD L. GORDON.

References Cited in the file of this patent

UNITED STATES PATENTS

| Number | Name | Date |
|---|---|---|
| 2,208,202 | Stanton | July 16, 1940 |
| 2,229,638 | Chamberlin | Jan. 28, 1941 |
| 2,280,948 | Gulliksen | Apr. 28, 1942 |
| 2,357,512 | Gaiser | Sept. 5, 1944 |
| 2,393,225 | Andalikiewicz | Jan. 22, 1946 |
| 2,403,561 | Smith | July 9, 1946 |
| 2,418,437 | Vogt | Apr. 1, 1947 |

FOREIGN PATENTS

| Number | Country | Date |
|---|---|---|
| 218,013 | Great Britain | June 30, 1924 |